United States Patent
Matsuzawa et al.

(10) Patent No.: US 12,067,372 B2
(45) Date of Patent: Aug. 20, 2024

(54) METHOD AND SYSTEM FOR RESTRICTING TRANSMISSION OF SENSITIVE INFORMATION CONTAINED IN A DOCUMENT

(71) Applicant: Hitachi, Ltd., Tokyo (JP)

(72) Inventors: Keiichi Matsuzawa, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 267 days.

(21) Appl. No.: 17/688,235

(22) Filed: Mar. 7, 2022

(65) Prior Publication Data

US 2022/0374616 A1 Nov. 24, 2022

(30) Foreign Application Priority Data

May 21, 2021 (JP) ................. 2021-086558

(51) Int. Cl.
*G06F 40/58* (2020.01)
*G06F 40/242* (2020.01)

(52) U.S. Cl.
CPC ............ *G06F 40/58* (2020.01); *G06F 40/242* (2020.01)

(58) Field of Classification Search
None
See application file for complete search history.

(56) References Cited

U.S. PATENT DOCUMENTS

| | | | | |
|---|---|---|---|---|
| 7,606,782 B2 * | 10/2009 | Haley | .............. | G06Q 10/10 706/50 |
| 10,313,520 B2 * | 6/2019 | Dwyer | .............. | G10L 15/26 |
| 10,606,957 B1 * | 3/2020 | Good | .............. | G06F 40/55 |
| 11,321,364 B2 * | 5/2022 | Lee | .............. | G06F 16/258 |
| 11,537,662 B2 * | 12/2022 | Cerino | .............. | G06F 40/169 |
| 2007/0195779 A1 * | 8/2007 | Judge | .............. | H04L 63/0263 370/235 |
| 2020/0019872 A1 * | 1/2020 | Canim | .............. | G06N 5/046 |

FOREIGN PATENT DOCUMENTS

JP H11-110395 A 4/1999

OTHER PUBLICATIONS

NetApp Cloud Data Sense, "Hybrid cloud and on-premises data discovery, mapping, and classification," https://cloud.netapp.com/netapp-cloud-data-sense Available at: https://web.archive.org/web/20210612025818/https://cloud.netapp.com/netapp-cloud-data-sense (Jun. 12, 2021).

* cited by examiner

*Primary Examiner* — Jesse S Pullias
(74) *Attorney, Agent, or Firm* — Volpe Koenig

(57) ABSTRACT

To provide a sentence data management method and a sentence data management system in which sentence data and a provision of a regulation are associated and a risk of legal violation associated with outbound transmission of the sentence data is reduced. A sentence data management system includes a processor configured to convert a word string of a first document described using a first term into a word string described using a third term; convert a word string of an outbound-transmitted second document described using a second term into a word string described using the third term; compare the first document and the second document by using a comparison result between the word string and the word string as a comparison result between the word string and the word string; and check a possibility of violation to the regulation in outbound transmission to determine the outbound transmission of the second document.

8 Claims, 14 Drawing Sheets

| CONVERSION SOURCE NOTATION | CONVERSION DESTINATION NOTATION | |
|---|---|---|
| DEVICE HAVING CALCULATION FUNCTION | COMPUTER | 531 |
| SERVER | COMPUTER | 532 |
| COMPUTER | COMPUTER | 533 |
| SYMMETRICAL ALGORITHM | SECURITY RELEVANT | 534 |
| SECURITY MANAGEMENT | SECURITY RELEVANT | 535 |
| ... | ... | |

224

| CONVERSION SOURCE NOTATION | CONVERSION DESTINATION NOTATION | |
|---|---|---|
| SUPERCOMPUTER | COMPUTER | 581 |
| CONTROLLER | COMPUTER | 582 |
| COMPUTE NODE | COMPUTER | 583 |
| ENCRYPTION KEY MANAGEMENT | SECURITY RELEVANT | 584 |
| RSA ENCRYPTION | SECURITY RELEVANT | 585 |
| ... | ... | |

FIG. 6
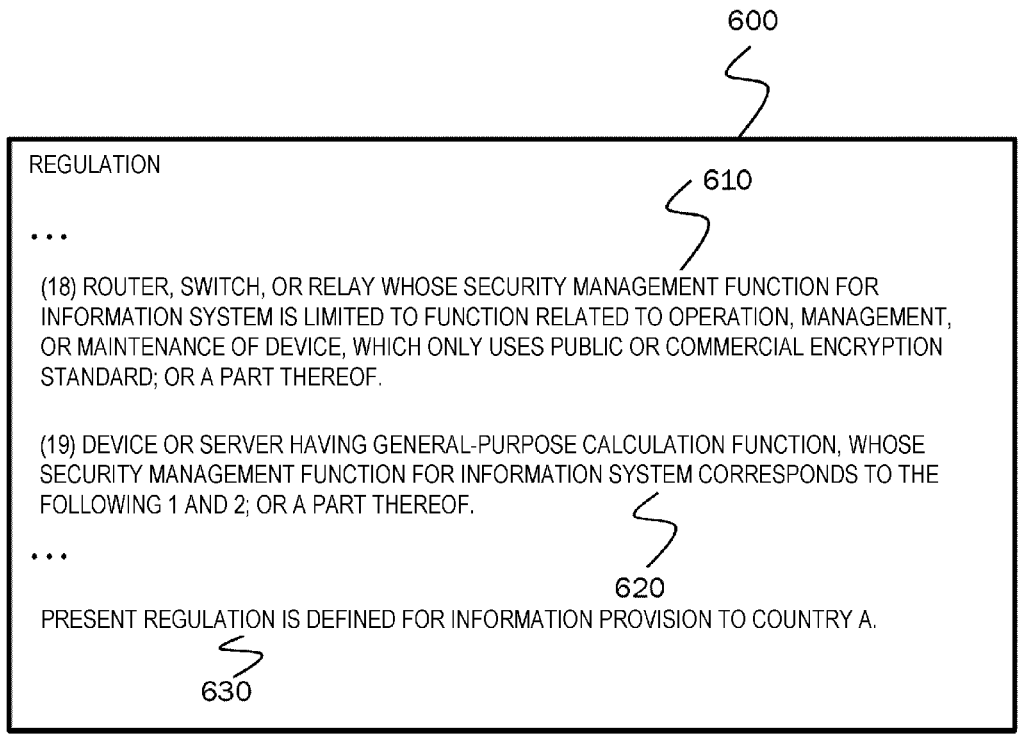
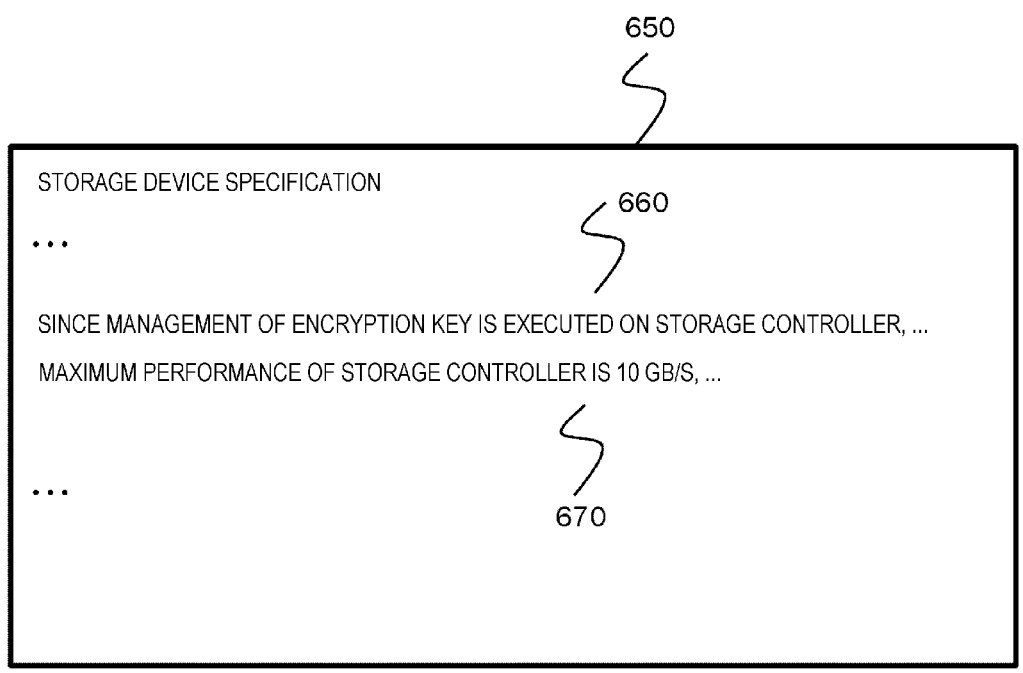

FIG. 7

| IN-DOCUMENT POSITION | REGULATION | PROVISION | SCORE | TERM CORRESPONDENCE INFORMATION | |
|---|---|---|---|---|---|
| CHAPTER 2 PARAGRAPH 2 | EXPORT TRADE CONTROL ORDER | ARTICLE 8 9-(B)-(19) | 0.9 | ·STORAGE CONTROLLER: DEVICE HAVING CALCULATION FUNCTION ·ENCRYPTION KEY MANAGEMENT: SECURITY MANAGEMENT | 720 |
| CHAPTER 3 PARAGRAPH 1 | EXPORT ADMINISTRATION REGULATIONS OF UNITED STATES | 4A003 | 0.8 | ·STORAGE CONTROLLER: DIGITAL COMPUTER | 721 |
| ... | | | | | |

METHOD AND SYSTEM FOR RESTRICTING TRANSMISSION OF SENSITIVE INFORMATION CONTAINED IN A DOCUMENT

BACKGROUND OF THE INVENTION

1. Field of the Invention

The present invention relates to a sentence data management method and a sentence data management system.

2. Description of the Related Art

As cloud technology develops, data utilization in a hybrid cloud configuration in which a public cloud and an in-house constructed private cloud are linked to each other has progressed. In the hybrid cloud, data utilization is optimized by selectively using the public cloud and the private cloud according to data, processes, and characteristics of computer resources.

In recent years, demands for data control with respect to personal information, technical information, confidential information, and the like have been strengthened by laws and regulations. For example, in laws such as General Data Protection Regulation (GDPR) for personal information and Export Administration Regulations of the United States for technical information, transmission of data including such information abroad is to be regulated. In addition, since these laws are being becoming stricter, it is considered that data control will be promoted in the future as well in preparation for the risk of legal violation in companies. On the other hand, it is a burden on the companies to appropriately implement data control. For example, in order to execute classification on whether certain technical information can be transmitted abroad, it is necessary to know both a technical field and a relevant law of the technical information, so that an education cost and an operation cost for an operator are high.

Therefore, in data management, a method of supporting compliance to these laws and regulations has been proposed. In a method disclosed in Non-Patent Document 1 (NETAPP BlueXP. "An AI-driven toolkit to automatically scan, analyze, and categorize your data, and then take the required actions" BlueXP Classification.), contents of data stored in a storage on a public cloud is scanned, and an administrator is notified when a text pattern considered to be personal information is found, and the administrator is prompted to compliance to these laws and regulations thereafter. In the method, a detection pattern is set for the personal information, and compliance to other laws and regulations is not considered.

In JP-A-11-110395, a method of searching for a similar document with respect to sentence data is proposed. It is considered that the method is used for associating a document and a law by using a legal document as the similar document to be searched for. However, it is considered that in document data including technical information and confidential information, technical terms and in-house terms may be frequently used. On the other hand, in the laws, legal terms are frequently used, and there is a deviation in terms. Therefore, an appropriate search may not be performed and the association may fail. In addition, an association in which a hierarchical structure and a reference relationship of the laws are considered is not executed.

SUMMARY OF THE INVENTION

Therefore, an object of the invention is to provide a sentence data management method and a sentence data management system in which document data and a provision of a regulation are associated, and a risk of regulation violation, such as legal violation, associated with outbound transmission of the document data is reduced.

According to a first aspect of the invention, the following sentence data management method is provided. The sentence data management method is executed using a computer. The sentence data management method is a method including: converting a word string 1 of a first document described using a first term, which is used for a sentence defining a regulation, into a word string 2 corresponding to the word string 1 and described using a third term which is a term different from the first term; converting a word string 3 of an outbound-transmitted second document described using a second term, which is used for a sentence, into a word string 4 corresponding to the word string 3 and described using the third term; comparing the first document and the second document by using a comparison result between the word string 2 and the word string 4 as a comparison result between the word string 1 and the word string 3; and checking a possibility of violation to the regulation in outbound transmission to determine the outbound transmission of the second document.

According to a second aspect of the invention, the following sentence data management system is provided. The sentence data management system includes a processor. The processor is configured to: execute a regulation and document association program to (1) convert a word string 1 of a first document described using a first term, which is used for a sentence defining a regulation, into a word string 2 corresponding to the word string 1 and described using a third term which is a term different from the first term; (2) convert a word string 3 of an outbound-transmitted second document described using a second term, which is used for a sentence, into a word string 4 corresponding to the word string 3 and described using the third term; (3) compare the first document and the second document by using a comparison result between the word string 2 and the word string 4 as a comparison result between the word string 1 and the word string 3; and (4) check, in execution of a sentence outbound transmission program, a possibility of violation to the regulation in outbound transmission to determine the outbound transmission of the second document.

According to the invention, a sentence data management method and a sentence data management system are provided in which document data and a provision of a regulation are associated, and a risk of regulation violation, such as legal violation, associated with outbound transmission of the sentence data is reduced.

BRIEF DESCRIPTION OF THE DRAWINGS

FIG. 5 illustrates an example of a term conversion dictionary according to the first embodiment.

FIG. 6 illustrates an example of a regulation and a document according to the first embodiment.

FIG. 7 illustrates an example of regulation information according to the first embodiment.

DESCRIPTION OF THE PREFERRED EMBODIMENTS

Figure 1:
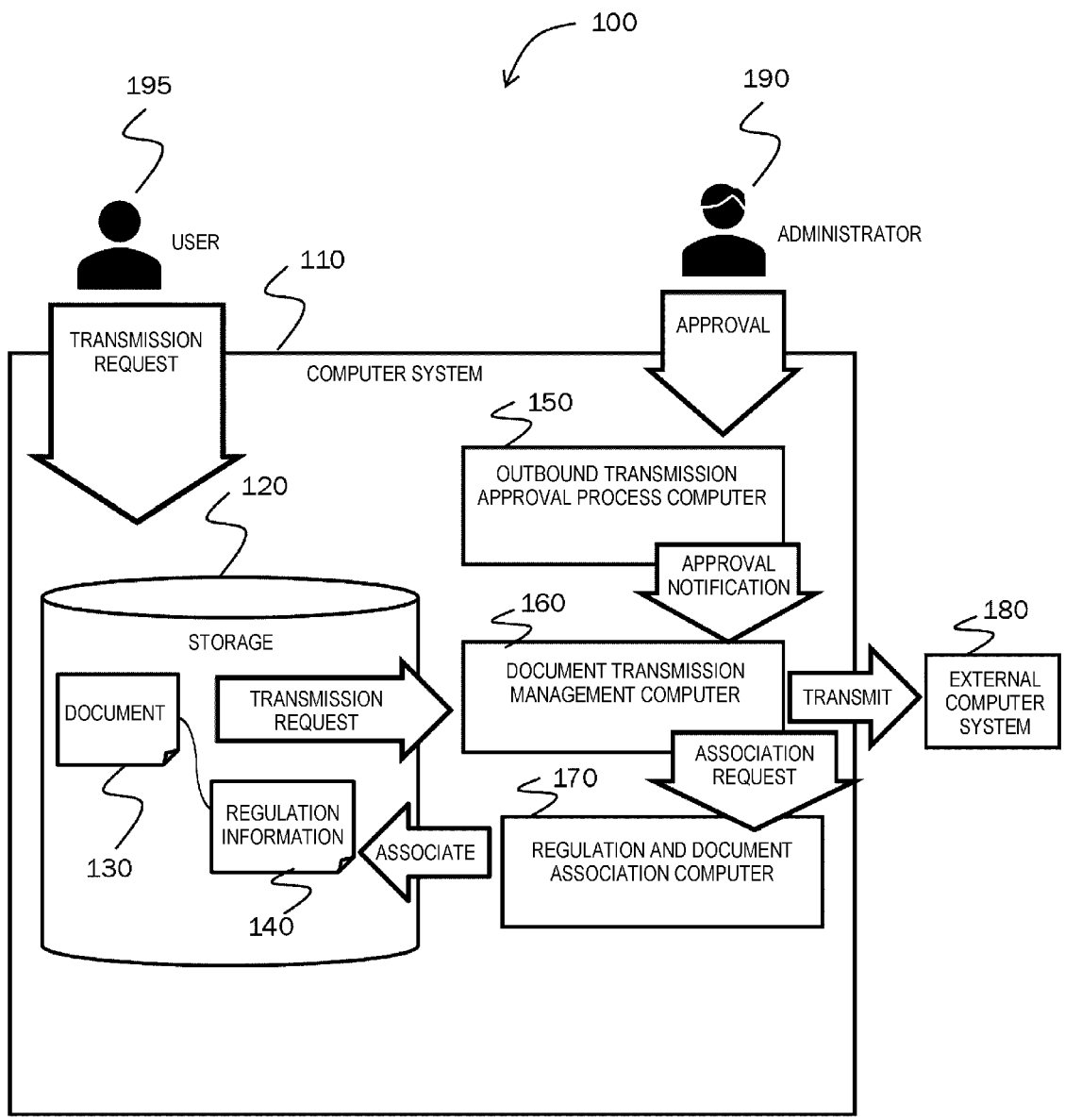
FIG. 1 is a computer system configuration diagram according to a first embodiment.

A first embodiment will be described with reference to FIG. 1. FIG. 1 illustrates a computer system configuration diagram 100 according to the present embodiment. The computer system 110 (a sentence data management system) can include a plurality of computers installed at a certain site. In the present embodiment, the computer system 110 includes a storage 120, an outbound transmission approval process computer 150, a document transmission management computer 160, and a regulation and document association computer 170. In FIG. 1, an external computer system 180 is a computer system installed at a site logically or physically different from that of the computer system 110. The external computer system 180 corresponds to, for example, a computer system of another company with respect to a company, a computer system of an overseas department installed abroad, a public cloud, or the like.

The storage 120 is a device that stores a document 130. The storage 120 may be a known storage medium, and examples of the storage medium constituting the storage 120 include a hard disk drive (HDD), a solid state drive (SSD), an optical disk, a magnetic disk, and a magnetic tape. The document 130 stores texts and text information. Examples of a storage format of the document 130 include a file, an object, a database, or the like. Therefore, the storage 120 can use the above-described storage medium to take an actual state matching the storage format of the document 130, such as a file storage, an object storage, or a relational database management system (RDBMS). The regulation information 140 is information assigned to the document 130 by the regulation and document association computer 170 based on information stored in the document 130, and is information related to a regulation associated with the document 130. The regulation information 140 is, for example, information listing a relationship indicating with which provision a specific page or paragraph of the document 130 is associated. The regulation information 140 is stored in the storage 120 in FIG. 1, but the regulation information 140 may be stored in the regulation and document association computer 170 or the document transmission management computer 160.

The regulation and document association computer 170 analyzes the sentences stored in the document 130, and associates the regulation information 140 with the document 130 according to contents of the sentences.

When a user 195 of the computer system 110 intends to transmit the document 130 stored in the storage 120 to the external computer system 180, the document transmission management computer 160 receives a transmission request and determines whether the document 130 can be transmitted. In this case, the document transmission management computer 160 may inquire, via the outbound transmission approval process computer 150, an administrator 190 of the computer system 110 about whether transmission is permitted.

Regarding the document 130 for which the transmission request is made in the document transmission management computer 160, the outbound transmission approval process computer 150 presents information of the document 130 and the regulation information 140 associated with the document 130 to the administrator 190, and receives an approval or a rejection with respect to the transmission request of the administrator 190.

Figure 2:
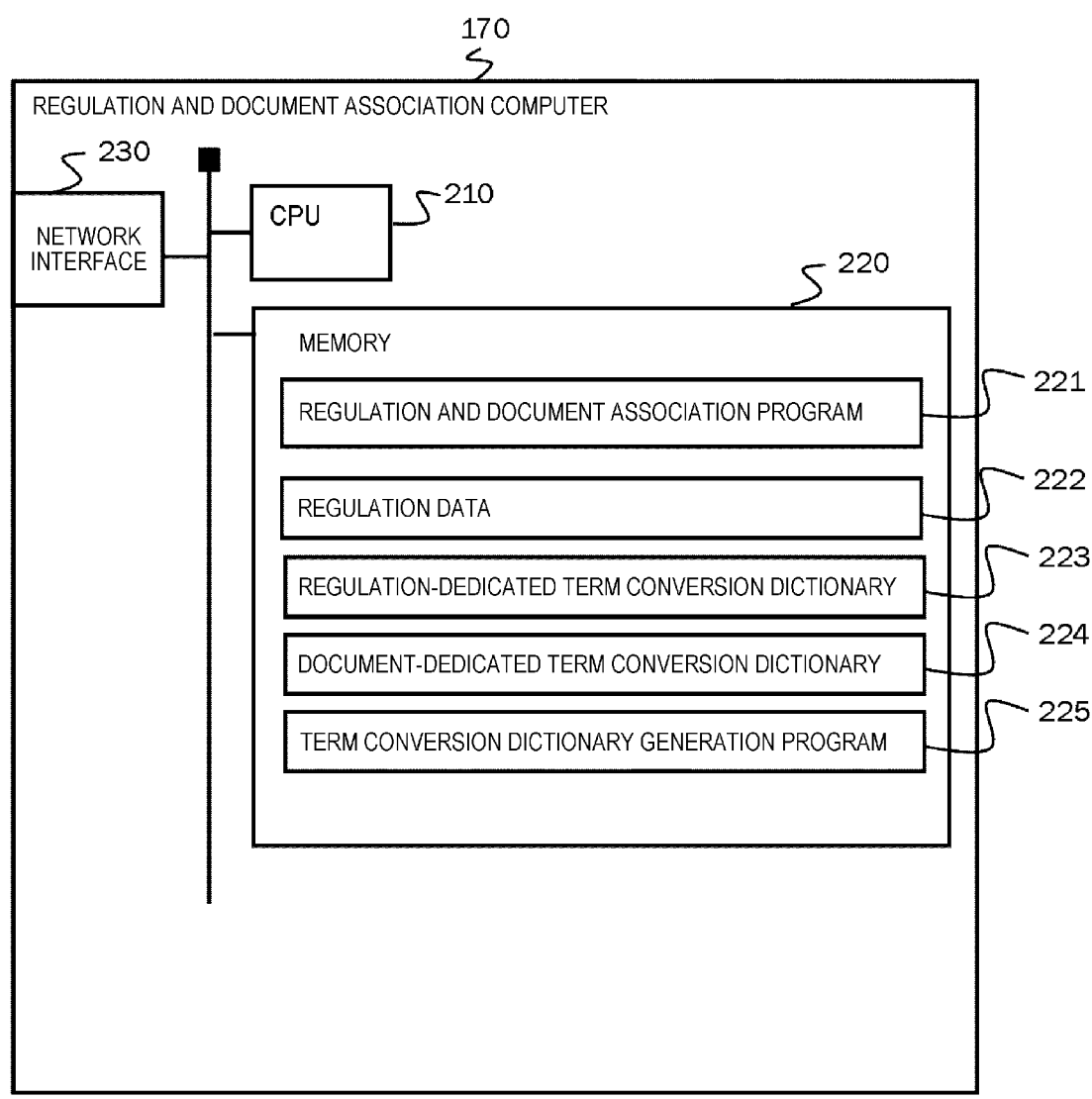
FIG. 2 is a diagram illustrating an example of a configuration of a regulation and document association computer according to the first embodiment.

Next, a specific configuration of the regulation and document association computer 170 will be described with reference to FIG. 2. FIG. 2 illustrates the regulation and document association computer 170. The regulation and document association computer 170 includes a CPU 210, a memory 220, and a network interface 230. The CPU 210 determines an operation of the regulation and document association computer 170 in accordance with various programs (a regulation and document association program 221 and a term conversion dictionary generation program 225) stored in the memory 220. The memory 220 stores the regulation and document association program 221, regulation data 222, a regulation-dedicated term conversion dictionary 223, a document-dedicated term conversion dictionary 224, and the term conversion dictionary generation program 225. The regulation and document association program 221 is a program used to assign the regulation information 140 to the document 130 stored in the storage 120. The regulation data 222 includes information (a name of a regulation, a content of a provision, a hierarchical relationship, and the like) with respect to various regulations which is referred to in a process of the regulation and document association program 221. The regulation-dedicated term conversion dictionary 223 is data to be used in the process of the regulation and document association program 221, can be used as a dictionary, and is used to convert a word stored in the regulation data 222. The document-dedicated term conversion dictionary 224 is data to be used in the process of the regulation and document association program 221, can be used as a dictionary, and is used to convert a word stored in the document 130. The term conversion dictionary generation program 225 is a program used to generate the regulation-dedicated term conversion dictionary 223 or the document-dedicated term conversion dictionary 224 (in a case where both the conversion dictionaries 223 and 224 are programs, data used by the programs) based on the regulation data 222, the document 130, or other textual data of an external book, newspaper, Web site, or the like. The network interface 230 is an interface for communicating with other computers in the computer system 110 as well as the storage 120. For the communication with the computers, a protocol widely used for communication among computers such as Ethernet, TCP/IP, and HTTP can be used. For the communication with the storage 120, the following protocol can be used: a protocol for receiving and transmitting data in units of files such as network file system (NFS) and server message block (SMB); a protocol for receiving and transmitting data in units of objects such as representation server transfer (REST); a protocol for receiving data from and transmitting data to a database such as open database connectivity (ODBC); and the like.

The above-described process is executed by the CPU 210 (that is, the processor) in accordance with procedures described in various programs. Similar to the above-described process, in the following description relating to the computer, the CPU (the processor) is a subject of the process of the program.

Positions at which various types of data (221 to 225) are stored are not particularly limited as long as a predetermined process can be executed, and the positions can be appropriately determined. Here, an example of a position of data will be described. In the example of FIG. 2, the regulation and document association computer 170 stores the regulation data 222, the regulation-dedicated term conversion dictionary 223, and the document-dedicated term conversion dictionary 224 in the memory 220, but these pieces of data may be stored in other positions as long as the data can be referred to by the CPU 210. For example, the regulation and document association computer 170 may include a storage medium, and data may be stored in the storage medium. The regulation and document association computer 170 may acquire these data from the inside and outside of the computer system 110 via the network interface 230. For example, a storage medium may be externally attached to the regulation and document association computer 170, and data may be stored in the storage medium.

Figure 3:
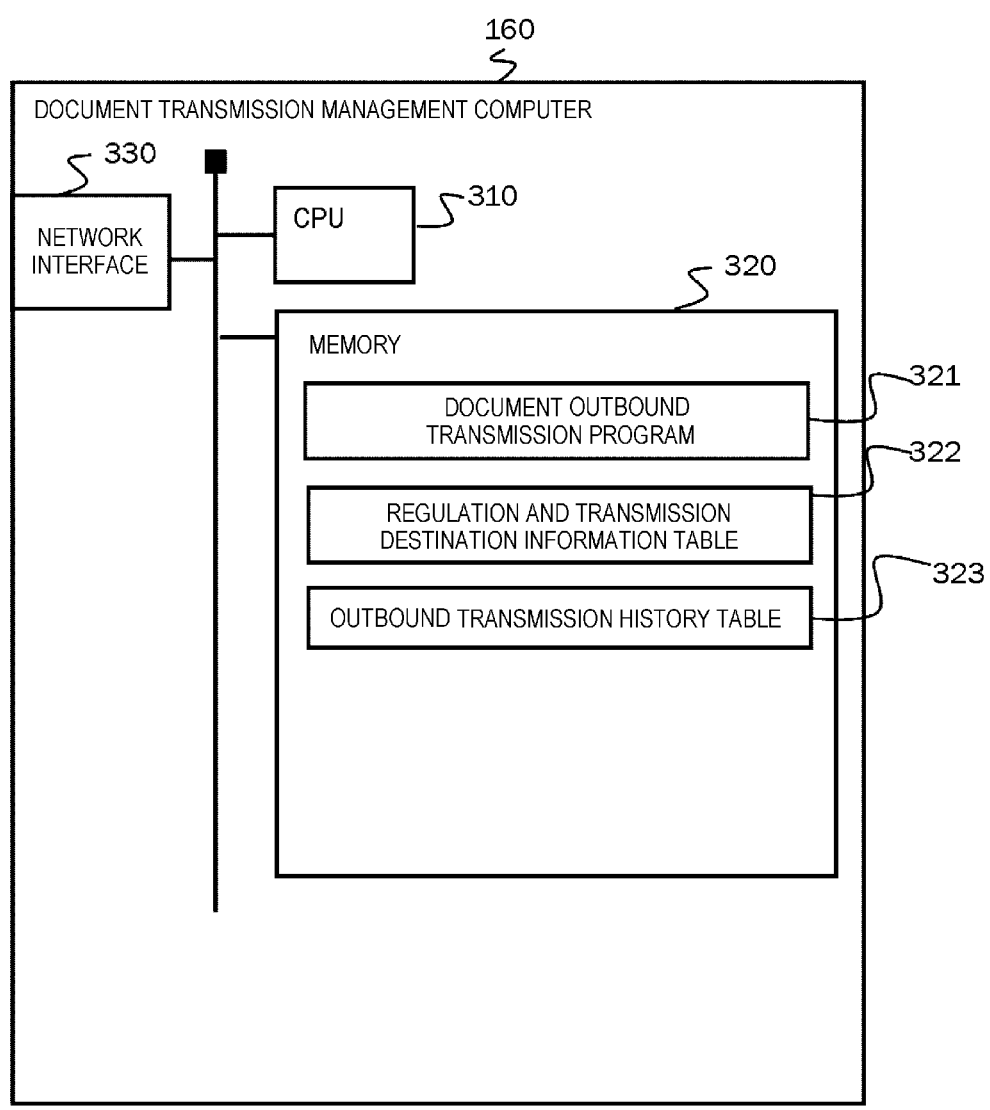
FIG. 3 is a diagram illustrating an example of a configuration of a document transmission management computer according to the first embodiment.

Next, a specific configuration of the document transmission management computer 160 will be described with reference to FIG. 3. FIG. 3 illustrates the document transmission management computer 160. The document transmission management computer 160 includes a CPU 310, a memory 320, and a network interface 330. The CPU 310 and the network interface 330 have the same roles (functions) as those of the CPU 210 and the network interface 230 provided in the regulation and document association computer 170, respectively. The memory 320 stores a document outbound transmission program 321, a regulation and transmission destination information table 322, and an outbound transmission history table 323. The document outbound transmission program 321 is a program that, when a user 195 intends to transmit the document 130 to the external computer system 180, transmits the document 130 based on a later-described regulation and document association process flow 800 executed in response to the reception of the transmission request. The regulation and transmission destination information table 322 is a table listing the correspondence relationship between a provision of the regulation and the external computer system 180 of a transmission destination to which the document 130 corresponding to the provision may be transmitted. The outbound transmission history table 323 is history information related to a document transmitted by the document outbound transmission program 321 in the past or a document whose transmission has been stopped.

Figure 4:
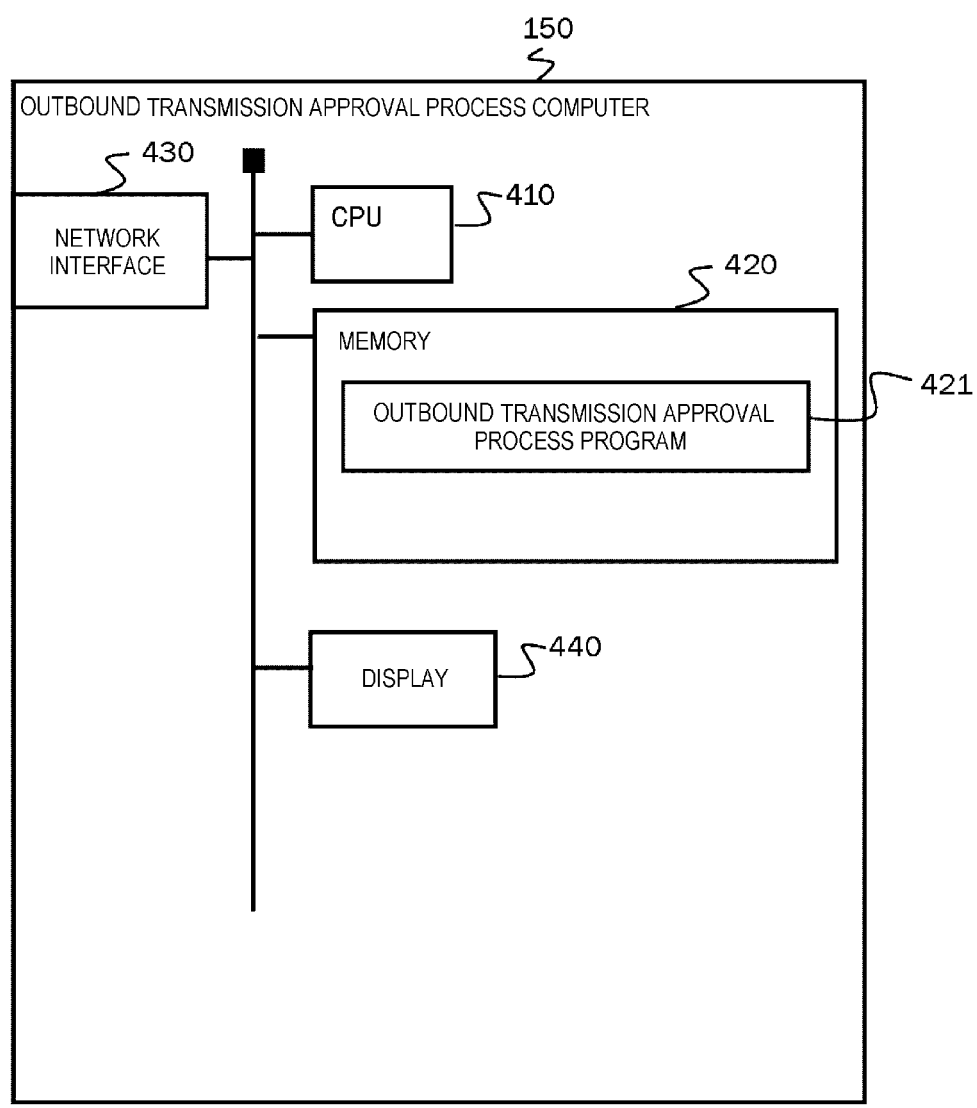
FIG. 4 is a diagram illustrating an example of a configuration of an outbound transmission approval process computer according to the first embodiment.

Next, a specific configuration of the outbound transmission approval process computer 150 will be described with reference to FIG. 4. FIG. 4 illustrates the outbound transmission approval process computer 150. The outbound transmission approval process computer 150 includes a CPU 410, a memory 420, a network interface 430, and a display 440. The CPU 410 and the network interface 430 have the same roles (functions) as those of the CPU 210 and the network interface 230 provided in the regulation and document association computer 170, respectively. The memory 420 stores an outbound transmission approval process program 421. The outbound transmission approval process program 421 operates when the document transmission management computer 160 executes the document outbound transmission program 321 to inquire the administrator 190 about whether the outbound transmission of the document 130 is permitted. The display 440 is used by the outbound transmission approval process computer 150 to display information to the administrator 190 by executing the outbound transmission approval process program 421. However, a structure, an arrangement, and the like are not particularly limited as long as the information can be displayed to the administrator 190. The display 440 may not necessarily be incorporated in the outbound transmission approval process computer 150. For example, by executing the outbound transmission approval process program 421, information necessary for screen display may be transmitted via the network interface 430 according to a protocol such as Hypertext Transfer Protocol (HTTP), and another computer receiving the information may execute the screen display to the administrator 190.

Next, the term conversion dictionary will be described with reference to FIG. 5. FIG. 5 illustrates examples of the regulation-dedicated term conversion dictionary 223 and the document-dedicated term conversion dictionary 224. Each of the examples is represented in a form that conversion source notations (510 and 560) and conversion destination notations (520 and 570) are listed in pair.

The conversion source notation 510 in the regulation-dedicated term conversion dictionary 223 is an excerpted part of the notation appearing in the regulation. A corresponding conversion destination notation 520 indicates a notation that is a conversion destination of a notation that coincides with the conversion source notation 510 that appears in the regulation. For example, when regulation data 522 includes a notation of "device having a calculation function", a conversion entry 531 indicates that the notation of "device having a calculation function" is converted into a notation of "computer". In a plurality of conversion entries, the conversion destination notations 520 may be the same. For example, all conversion entries (531, 532, and 533) have the same conversion destination notation 520 of "computer". This means that all notations of "device having a calculation function", "server", and "computer" described in the conversion source notation 510 can be regarded as the "computer". The conversion destination notation 520 may not be an expression described in a natural language. For example, the conversion destination notation may be replaced with an ID number assigned to an expression, such as Wordnet, or may be replaced with a word expressed in a form of a numerical vector, such as Word2Vec. A correspondence between the conversion source notation 510 and the conversion destination notation 520 may be described as a regulation or an algorithm for generating the conversion destination notation 520 based on the conversion source notation 510, in addition to a form of listing the conversion entry in which the conversion source notation 510 and the conversion destination notation 520 are in one-to-one correspondence as illustrated in the example of FIG. 5.

The conversion source notation 560 and the conversion destination notation 570 in the document-dedicated term conversion dictionary 224 are the same as the conversion source notation 510 and the conversion destination notation 520 in the regulation-dedicated term conversion dictionary 223 except that a document is targeted instead of a regulation.

In each of the conversion source notations (510 and 560), a vocabulary to be applied is used. For example, the conversion source notation 510 mainly uses a term that appears in a regulation, and the conversion source notation 560 mainly uses a term that appears in a document. Each of the conversion destination notations (520 and 570) uses a common term that is not particularly biased to a regulation or a document. The common term may be, for example, a general term. In this way, it is assumed that a difference in vocabulary between a regulation and a document is removed.

Here, examples of a regulation and a document will be described. FIG. 6 illustrates examples of a regulation 600 and a document 650.

The regulation 600 includes legal terms and is expressed as a list of provisions. A legal term can be considered as an example of a first term which is a term used in a sentence defining a regulation, and the regulation 600 can be considered as an example of a first sentence described by the first term. In FIG. 6, two provisions (a provision 610 and a provision 620) of the regulation 600 are illustrated. Each provision is expressed mainly by words, idioms, and sentences using a natural language. As long as the notation can be converted into a natural language notation, a chemical formula or a symbol may be used.

In addition, the regulation 600 may include a provision of a transmission destination 630 to which the regulation 600 is applied. The example in FIG. 6 includes a provision indicating that the regulation 600 is a regulation defining a provision of information to country A. The information is extracted by the document transmission management computer 160 and stored in advance in the regulation and transmission destination information table 322.

The document 650 is expressed as a list of paragraphs. The example in FIG. 6 is a document including technical terms, and illustrates paragraphs (660 and 670) of the document. A technical term can be considered as an example of a second term used in a document to be transmitted outward, and the document 650 can be considered as an example of a second sentence described by the second term. Each paragraph is expressed mainly by words, idioms, and sentences using a natural language. As long as the notation can be converted into a natural language notation, a chemical formula or a symbol may be used.

Next, the regulation information will be described with reference to FIG. 7. FIG. 7 illustrates an example of the regulation information 140 assigned to the document 130.

The regulation information 140 has a form in which entries in which an in-document position 710, a regulation 711, a provision 712, a score 713, and term correspondence information 714 are listed such as entries 720 and 721. Each entry indicates information related to association between a certain part of a document and a provision of a regulation.

The in-document position 710 indicates position information in the document indicated by the entry. As the position information, a page number, a paragraph number, a chapter, a section, a subsection, a sentence, or the like can be used. The regulation 711 and the provision 712 indicate information that specifies a regulation indicated by an entry, and a provision of the regulation. The score 713 stores a value indicating a strength (for example, a degree of association or a degree of similarity) of association between the document indicated by the entry and the provision of the regulation. The term correspondence information 714 indicates, regarding the word in the document and the word in the provision of the regulation, a pair of words that coincide with each other as a result of using the regulation-dedicated term conversion dictionary 223 and the document-dedicated term conversion dictionary 224. The term correspondence information 714 is auxiliary information, and may be omitted when the regulation information 140 is configured.

Figure 8:
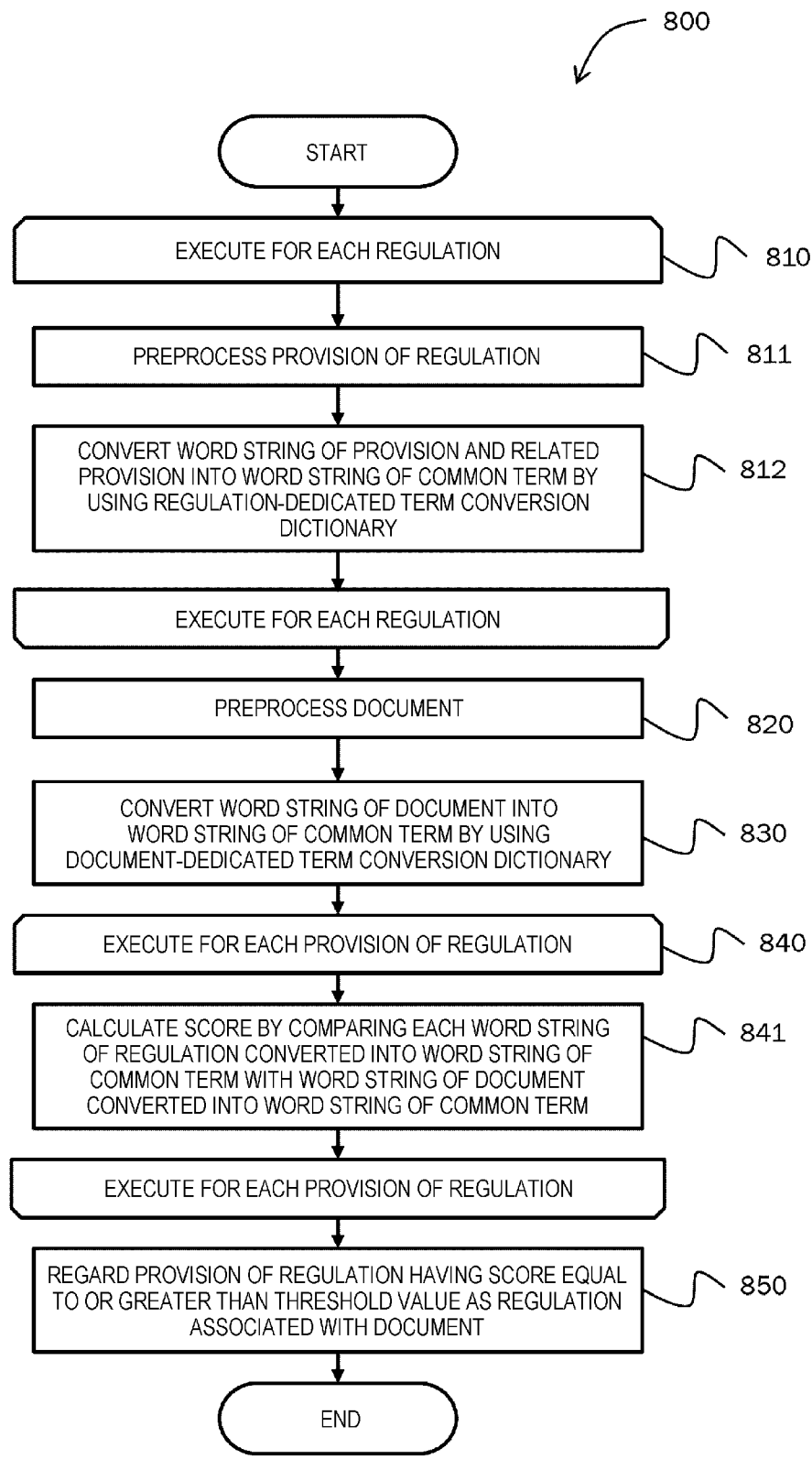
FIG. 8 illustrates a regulation and document association process flow according to the first embodiment.

FIG. 8 illustrates a regulation and document association process flow 800. The regulation and document association computer 170 executes the flow 800 in accordance with the regulation and document association program 221.

In the flow 800, a loop 810 is a process targeting only the regulation. Therefore, the loop 810 may be executed at a different timing from step 820 and subsequent steps. For example, the loop 810 can be executed in advance in a state in which a document to be processed is not yet prepared. When the flow 800 is executed on a plurality of documents, a result of the loop 810 may be shared by the documents.

In the loop 810, the regulation and document association computer 170 executes a process for each regulation stored in the regulation data 222. In step 811, preprocessing of each provision of the regulation is executed, and in the preprocessing, a process depending on a used language is executed. For example, the process includes: removal of unnecessary symbols or the like; division of regulations for each paragraph or page; morphological analysis or normalization of kana-kanji and alphanumeric characters in a case of Japanese; normalization of uppercase and lowercase characters in a case of English; and Lemmatization. When the regulation includes a content described in a format other than the natural language such as a chart, the process includes a process of extracting the described content or a caption as the natural language. In step 812, when the provision of the regulation includes a word matching the conversion source notation 510 in the regulation-dedicated term conversion dictionary 223, the word is replaced with a corresponding conversion destination notation 520 of a corresponding entry, and a word string (a word string 2) using the common term (a third term) is generated.

Step 820 and subsequent steps of the flow 800 are processes targeting a document. In step 820, the regulation and document association computer 170 executes preprocessing for the document. A content of the preprocessing is the same as that of the process executed for each provision of the regulation in step 811. In step 830, when the document includes a description that matches the conversion source notation 560 in the document-dedicated term conversion dictionary 224, the description is replaced with the conversion destination notation 570 of the corresponding entry, and a word string (a word string 4) using the common term (the third term) is generated.

In a loop 840, the regulation and document association computer 170 executes a process for each provision of the regulation for which the loop 810 is executed with respect to the document on which processes of steps 820 and 830 are executed. In step 841, the word string using the common term, generated based on the provision of the regulation and obtained in step 812 and the word string using the common term, generated based on the document and obtained in step 830 are compared to calculate a score (a value corresponding to the degree of association or the degree of similarity). As a method for comparing the word strings, an existing algorithm can be used. For example, calculation of a relevance ratio and a reproduction ratio in N-gram, BiLingual Eval Understand (BLEU), or the like can be used. If numerical vectors are used as the conversion destination notations (520 and 570) in the regulation-dedicated term conversion dictionary 223 and the document-dedicated term conversion dictionary 224, a distance between the numerical vectors may be used. The values may be calculated while being weighted for each word. For example, there is a calculation method in which parts of speech having no significant meaning in a sentence such as a particle or a preposition, or a word having a high appearance frequency such as "a" or "this" is reduced in weight. A comparison result for each word indicating which word in the provision of the regulation and which word in the document have particularly high degree of association or similarity may also be held.

In step 850, the regulation and document association computer 170 regards, as a provision associated with a document, a provision of a regulation having a value equal to or greater than preceding values or a threshold value among scores compared with the document for each provision of the regulation in the loop 840. The result is stored as an entry of the regulation information 140 for each provision. At this time, a value corresponding to the degree of association or the degree of similarity calculated in step 841 is stored in the score 713, and the term correspondence information 714 stores, regarding the word in the document and the word in the provision of the regulation obtained in step 841, information on a pair of words that coincide with each other as a result of using the regulation-dedicated term conversion dictionary 223 and the document-dedicated term conversion dictionary 224.

Figure 9:
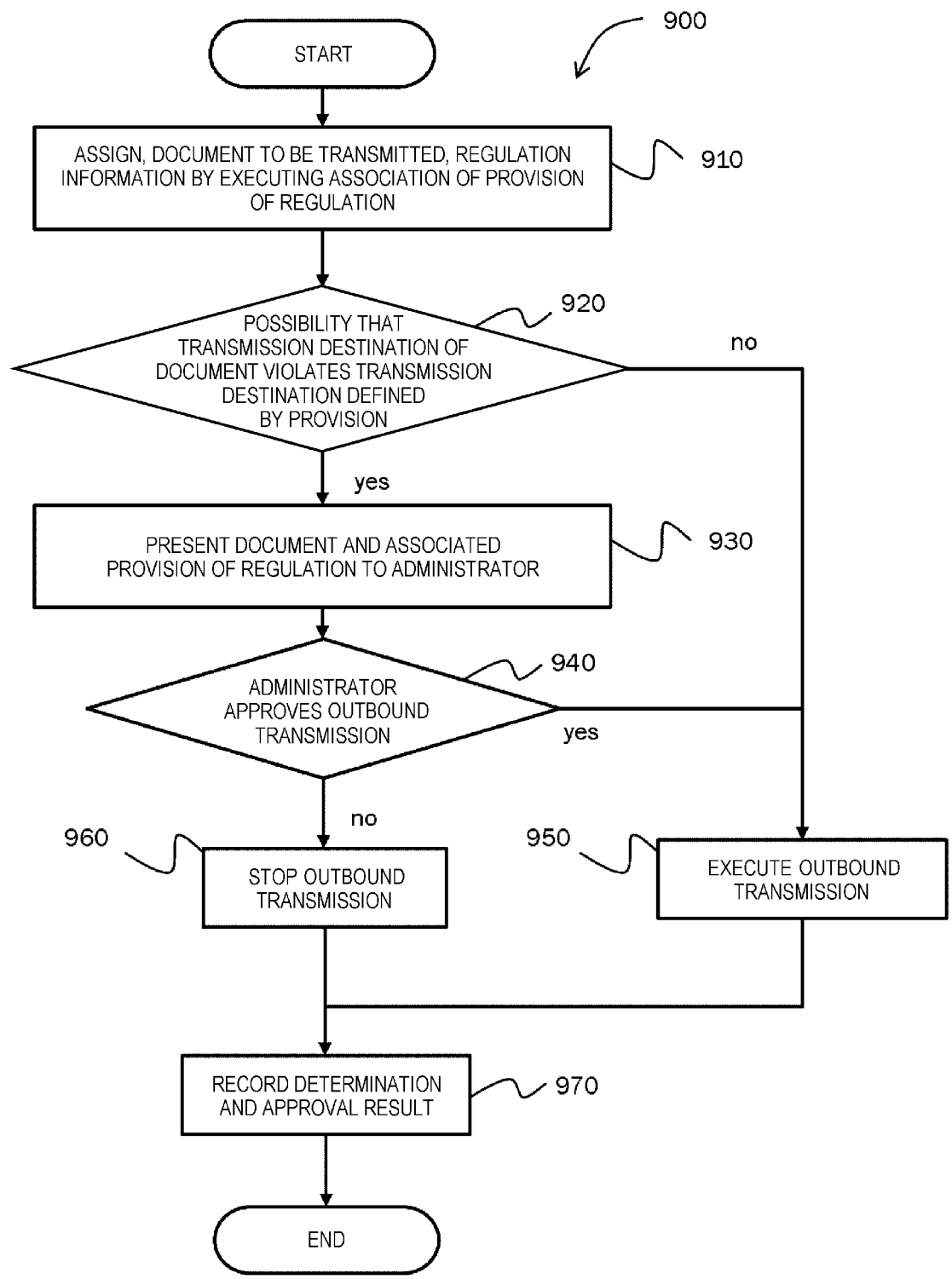
FIG. 9 illustrates a document outbound transmission process flow according to the first embodiment.

FIG. 9 illustrates a document outbound transmission process flow 900. In a process until the user 195 of the computer system 110 transmits the document 130 to the external computer system 180, the document transmission management computer 160 takes the initiative to execute the flow 900. In the flow 900, the document transmission management computer 160 executes the document outbound transmission program 321. Here, the process related to the flow 900 may be executed, for example, at the following timing. As one timing, it is conceivable that all steps in the flow 900 are executed at a timing when the user 195 instructs transmission to the external computer system 180. As another timing, it is conceivable that the process related to the flow 900 is executed at a timing when, step 810 is executed at a stage where the document 130 is stored in the storage 120 for the first time, and the user 195 instructs the transmission to the external computer system 180 in the subsequent steps. As further another timing, it is conceivable that step 940 and subsequent steps are executed at a timing when, steps 930 and preceding steps were finished before the user 195 instructs the transmission to the external computer system 180, and the user 195 instructs the transmission. Hereinafter, a process in the flow 900 will be described by taking, as a representative example, a case in which all steps are executed at a timing when the user 195 instructs the transmission to the external computer system 180, which is described as the first timing.

First, the user 195 instructs, for the storage 120, transmission of the document 130 in the storage 120 to the external computer system 180 via the document transmission management computer 160. Accordingly, the flow 900 is started. In step 910, the document transmission management computer 160 sends a request to the regulation and document association computer 170, the regulation and document association computer 170 executes the flow 800, and whereby the regulation and document association computer 170 assigns the regulation information 140 to the document 130.

In subsequent step 920, the document transmission management computer 160 collates the regulation information 140, the regulation and transmission destination information table 322, and a location of the external computer system 180 as the transmission destination, and determines whether the regulation information 140 includes a regulation that limits the transmission of the document to the external computer system 180. In a case where provisions of a plurality of regulations are stored in the regulation information 140, if there is at least one provision that limits the transmission, it is determined that the regulation information 140 includes a regulation that limits the transmission. In a case where there is no regulation for limiting document transmission to the external computer system 180 in step 920, the document transmission management computer 160 transmits the document 130 to the external computer system 180 in step 950. Then, the process proceeds to step 970, and a process in step 970 is executed. Otherwise, the process proceeds to step 930 and a process in step 930 is executed.

In step 930, the document transmission management computer 160 requests the administrator 190 to approve the transmission of the document 130 to the external computer system 180 via the outbound transmission approval process computer 150. In step 930, in order to support the approval by the administrator 190, the outbound transmission approval process computer 150 presents the document 130 and the provision of the regulation associated with the document 130. A specific presentation example will be described later.

In step 940, based on the presentation in step 930, the administrator 190 approves or rejects the transmission of the document 130 to the external computer system 180. As a result, the outbound transmission approval process computer 150 notifies the document transmission management computer 160. If the administrator 190 approves the transmission in step 940, the document transmission management computer 160 actually transmits the document 130 to the external computer system 180 in step 950. If the administrator 190 rejects the transmission in step 940, the document transmission management computer 160 stops transmitting the document 130 to the external computer system 180 in step 960. No matter what the results in step 920 and step 940 are, the document transmission management computer 160 records the results in the outbound transmission history table 323 together with a document name, a date, and an administrator name in step 970.

In the flow 900, the document transmission management computer 160 executes procedures of step 920 and subsequent steps by appropriately referring to the regulation information 140 and the regulation and transmission destination information table 322, but in a case where another component has an access control function, the function may be used, or the function may be substituted. For example, in a case where the storage 120 has a function of executing access permission on the document 130, the document transmission management computer 160 executes a procedure in which an access permission of the document 130 from a specific country is set/removed with respect to the storage 120 based on the result in step 910, thereby prohibiting reading and writing of the document 130 from the specific country, and in step 950, instead of executing outbound transmission, the prohibition of the access permission is released to allow reading and writing of the document 130 from the specific country again.

Figure 10:
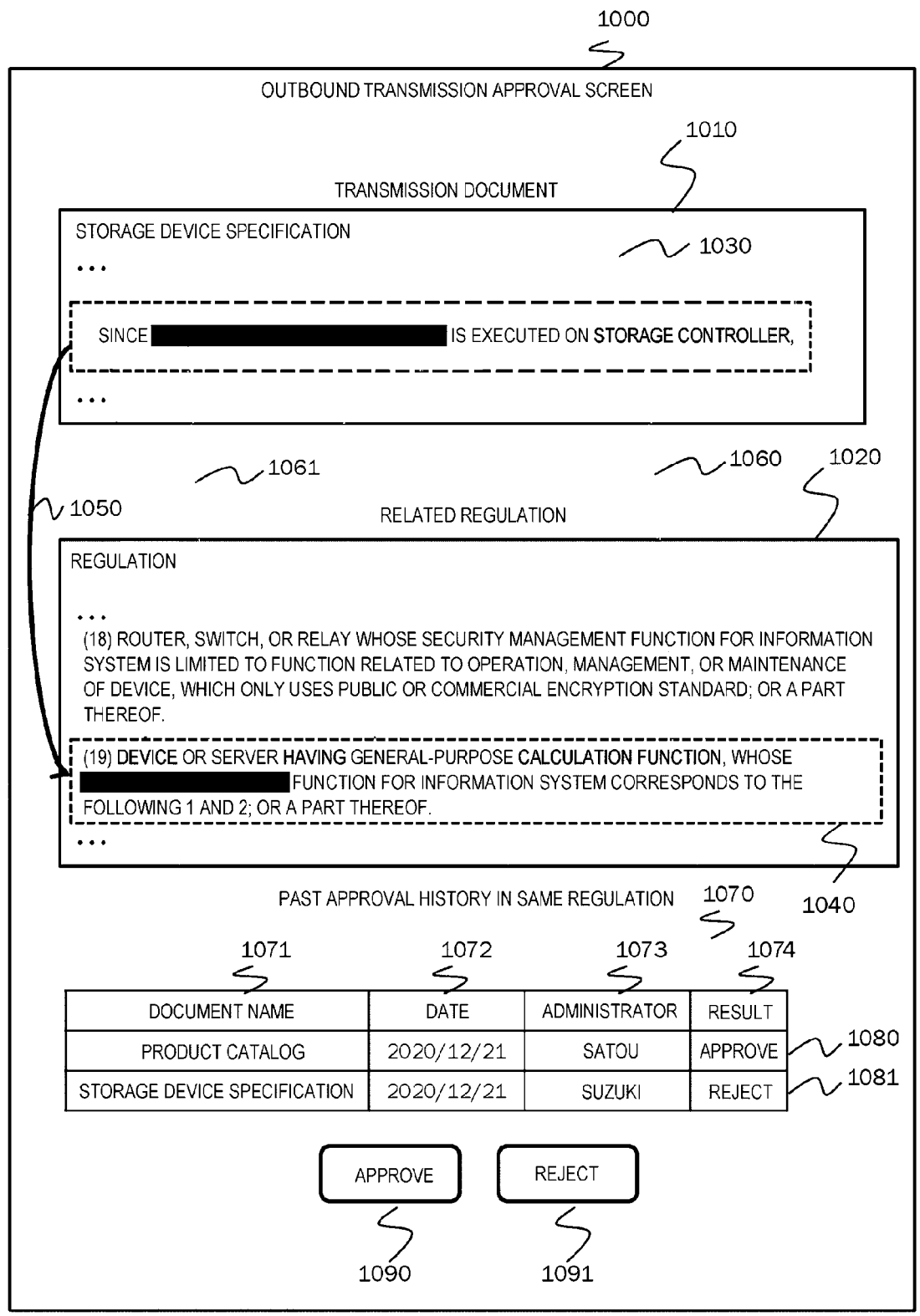
FIG. 10 illustrates an example of a document outbound transmission approval screen according to the first embodiment.

FIG. 10 illustrates an example of a document outbound transmission approval screen 1000 used in the processes of steps 930 and 940.

The outbound transmission approval screen 1000 includes a transmission document field 1010, a related regulation field 1020, a past approval history field 1070, an approval button 1090, and a rejection button 1091. The transmission document field 1010 displays the content of the document 130 to be transmitted. The related regulation field 1020 displays a part of regulations indicated by the regulation 711 and the provision 712 in the regulation information 140 assigned to the document 130.

In the transmission document field 1010 and the related regulation field 1020, information corresponding to each entry of the regulation information 140 is displayed in an auxiliary manner, and in the example of FIG. 10, information of an entry 720 is displayed. An emphasis item 1030 in the transmission document field 1010 emphasizes a position indicated by the in-document position 711 in the document. An emphasis item 1040 in the related regulation field 1020 emphasizes a position indicated by the regulation 712 or the provision 713 in the regulation. A connection relationship 1050 indicates that the emphasis item 1030 and the emphasis item 1040 are stored in the same entry in the regulation information 140. In addition, the connection relationship 1050 indicates correspondence relationships (1060 and 1061) between terms stored in the term correspondence information 714 between the emphasis item 1030 and the emphasis item 1040. Here, information on the correspondence relationship can be shown in an appropriate form, and as illustrated in FIG. 10, a display different from other forms (for example, a display in which a difference in font, presence or absence of coloring, and the like are considered) may be executed, or the correspondence relationship may be shown by a dotted line or the like. A fact that the emphasis item 1030 and the emphasis item 1040 are associated with each other is presented to the administrator 190, who views the outbound transmission approval screen 1000, by the emphasis items (1030 and 1040), the connection relationship 1050, and the correspondence relationships (1060 and 1061) between terms.

In the past approval history field 1070, by referring to the outbound transmission history table 323, and the regulation 712 and the provision 713 which are stored in the regulation information 140 assigned to the document 130, information on a document, in which the regulation 712 and the provision 713 or a document name 1071 match that in a past transmission history, is displayed. The past approval history field 1070 includes a plurality of histories (1080 and 1081) in each of which the document name 1071, a date 1072, an administrator 1073, and a result 1074 are listed. One history shows information when one document is approved or rejected once. The document name 1071 shows the document 130 approved or rejected in the history. The date 1072 shows a date on which approval or rejection is determined in the history. The administrator 1073 shows the administrator 190 at the time of determining the approval or rejection in the history. The result 1074 shows a determination result including the approval or rejection in the history.

When the regulation information 140 includes a plurality of entries, the related regulation field 1020 and the past approval history field 1070 may display information corresponding to the number of entries. In this example, only a single provision is shown.

Since the administrator 190 can grasp details of the provision of the regulation associated with the document 130 to be transmitted based on the related regulation field 1020 and the past approval history field 1070, the administrator 190 can determine whether the document 130 can be finally transmitted to the external computer system 180 by reading through both the related regulation field 1020 and the past approval history field 1070. Then, the administrator 190 presses the approval button 1090 when it is determined that the transmission is permitted, and presses the rejection button 1091 when it is determined that the transmission is not permitted, and thus step 940 is ended.

According to the present embodiment, when sentence data in a computer system is to be transmitted to an external computer system, even if the sentence data is described in a sentence using a term different from that used in a regulation, document transmission with a risk of legal violation can be prevented. As a means, when a regulation and a document are associated, a word string of a sentence in the regulation is converted into a word string of a general term, a word string of a sentence in the document is similarly converted into a word string of a general term, and the word strings can be compared after being aligned with the word strings of the general term, and a result is handled as a comparison result of the regulation and the document. In a case where a law associated with a document is found in the above-mentioned comparison and there is a possibility that the document transmission is illegal, when the document is to be transmitted to the external computer system, the document and the law are presented to the administrator to prompt the administrator to approve the document, and the document is transmitted only when the approval is obtained. Accordingly, it is possible to support the administrator-based determination of the document outbound transmission, and to stop the document outbound transmission based on the determination result.

Next, a second embodiment will be described. The second embodiment relates to a method of generating the regulation-dedicated term conversion dictionary 223 and the document-dedicated term conversion dictionary 224 in the first embodiment. In descriptions of the second embodiment, descriptions that are the same as contents already described may be omitted.

At present, a method of generating a synonym dictionary by applying machine learning to many textual data sets is disclosed (for example, Kaname Kasahara, Nozomu Inago, and Tsuneaki Kato, Automatic Generation of Synonyms Usage Textual Data. Transactions of the Japanese Society for Artificial Intelligence, 2003, 18.4: 221-232). In addition, a method of applying machine learning to a textual data set such as Word2Vec described above to configure distributed representation of words is disclosed. By using these known techniques into a textual data set in which documents using a plurality of types of terms are mixed, it is possible to configure a term conversion dictionary for the plurality of types of terms.

Figure 11:
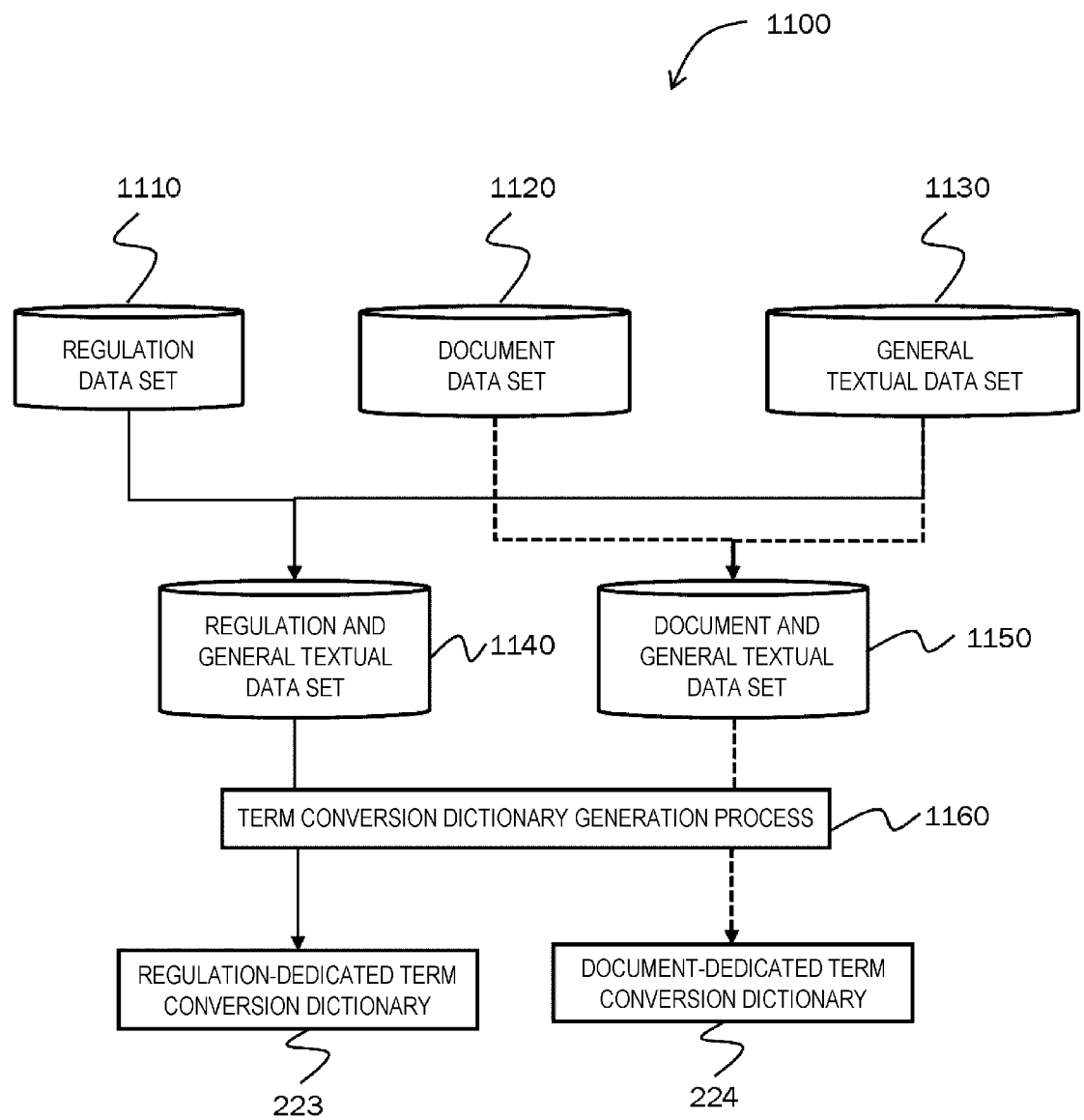
FIG. 11 is a diagram illustrating a construction procedure of a term conversion dictionary according to a second embodiment.

FIG. 11 illustrates a dictionary construction procedure 1100 showing data and a process flow when the regulation-dedicated term conversion dictionary 223 and the document-dedicated term conversion dictionary 224 are constructed based on various textual data sets by using these term conversion dictionary construction methods. The dictionary construction procedure 1100 may be appropriately executed, and for example, the regulation and document association computer 170 may execute the term conversion dictionary generation program 225 to construct a dictionary. The dictionary construction procedure 1100 may be appropriately executed outside the computer system 110 to construct the dictionary, and the computer system 110 may acquire the dictionary constructed by an appropriate method.

In the dictionary construction procedure 1100, a regulation data set 1110, a document data set 1120, and a general textual data set 1130 as original textual data sets are used. The regulation data set 1110 is a collection of sentences in the regulation 600, and is a textual data set in which terms unique to the regulation are frequently used. The document data set 1120 is a collection of sentences in the document 650, and is a textual data set in which terms unique to the document are frequently used. The general textual data set 1130 is a textual data set in which many general texts are collected, and corresponds to newspapers, Web texts, books, academic papers, patent documents, and the like.

In the dictionary construction procedure 1100, a regulation and general textual data set 1140 in which the regulation data set 1110 and the general textual data set 1130 are combined is created, and a term conversion dictionary generation process 1160 using the above-mentioned existing method or the like (that is, a method of applying machine learning or the like) is applied to the regulation and general textual data set 1140 to generate the regulation-dedicated term conversion dictionary 223. Similarly, a document and general textual data set 1150 in which the sentence data set 1120 and the general textual data set 1130 are combined is created, and the term conversion dictionary generation process 1160 is applied to the document and general textual data set 1150 to generate the document-dedicated term conversion dictionary 224. At this time, as the conversion destination notation 520 in the regulation-dedicated term conversion dictionary 223 and the conversion destination notation 570 in the document-dedicated term conversion dictionary 224, notations appearing in the general textual data set 1130 or representations thereof by IDs or numerical vectors are used.

According to the present embodiment, the computer system in the first embodiment can also be used by generating a term conversion dictionary for a regulation or a document without a term conversion dictionary. By including the general textual data set in the textual data set used for generating the term conversion dictionary, the notation in the general textual data set can be used as the conversion destination notation 520 in the regulation-dedicated term conversion dictionary 223 or the conversion destination notation 570 in the document-dedicated term conversion dictionary 224. Therefore, it is possible to indirectly compare the notation unique to the regulation and the notation unique to the document through conversion into the notation in the general textual data set. In addition, by separately using the regulation data set 1110 and the textual data set of the generation source to generate the regulation-dedicated term conversion dictionary 223, and using the sentence data set 1120 and the textual data set of the generation source to generate the document-dedicated term conversion dictionary 224, when the same notation is used in different meanings between the regulation and the document, the same notation can be converted into different conversion destination notations between the regulation-dedicated term conversion dictionary 223 and the document-dedicated term conversion dictionary 224, and can be prevented from being confused by mistake.

Next, a third embodiment will be described. The third embodiment relates to the regulation and document association process in the first embodiment. In descriptions of the third embodiment, descriptions that are the same as contents already described may be omitted.

In the first embodiment, for the regulation and the document, and the conversion destination notation using the term conversion dictionary, there is a difference in terms, but the same language is used. The third embodiment describes a method of comparing the word strings of the document and the regulation in a case where the regulation and the document use the same language, and by converting, even in a case where the regulation and the document use different languages, the languages into a language different from both the language of the regulation and the language of the document. In the descriptions of the third embodiment, the descriptions that are the same as the contents already described may be omitted.

Hereinafter, an example in which a regulation and a document are described in Japanese, but English is used for comparison (that is, as a comparison language) will be described. The languages used in the present embodiment are not limited to Japanese and English, and any other languages can be used.

Figure 12:
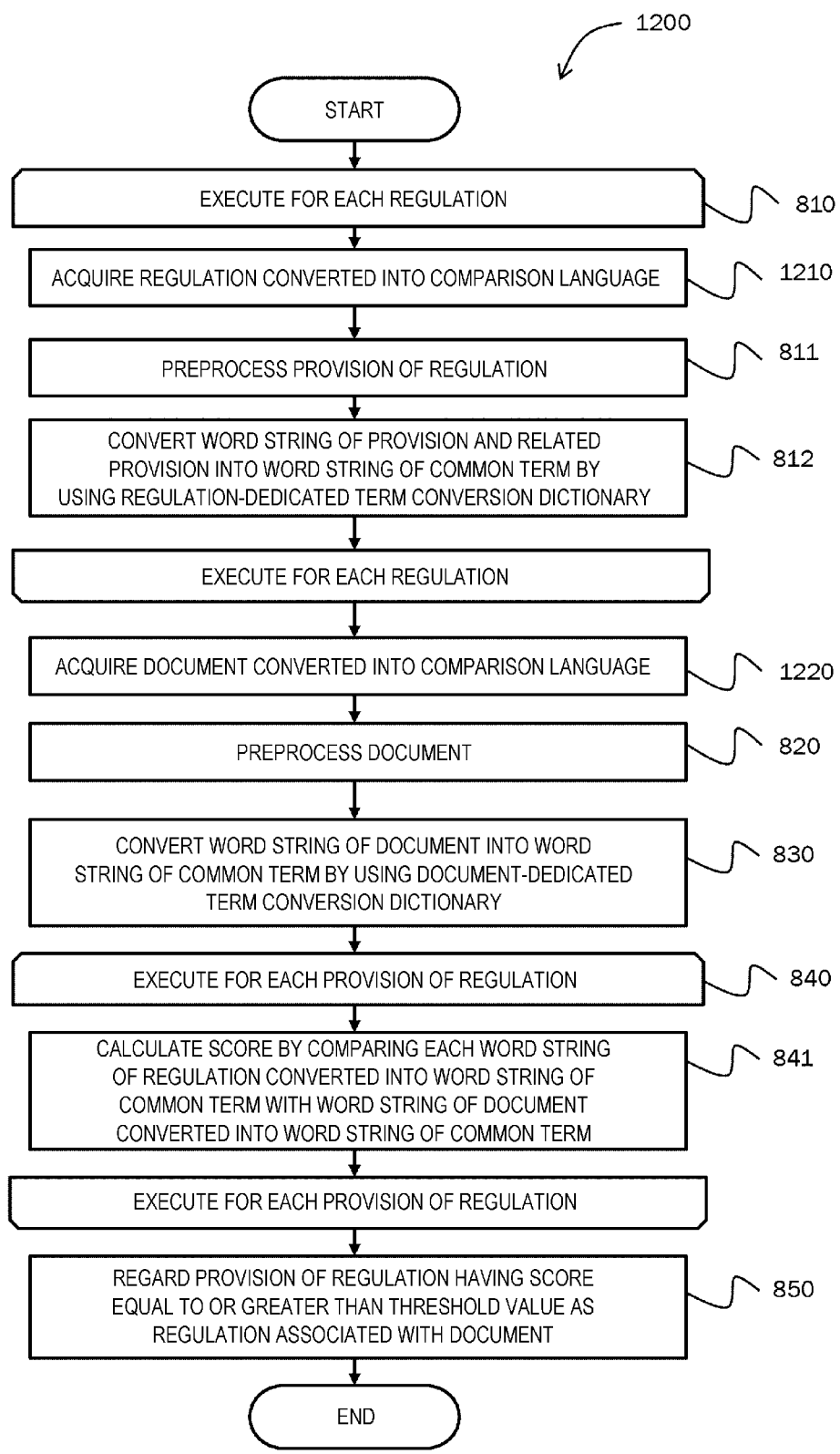
FIG. 12 illustrates a regulation and document association process flow according to a third embodiment.

FIG. 12 illustrates a regulation and document association process flow 1200. The regulation and document association process flow 1200 is a flow in which steps 1210 and 1220 are added to the regulation and document association process flow 800 in the first embodiment. Since other steps are the same as those of the regulation and document association process flow 800, steps 1210 and 1220 will be described below.

In step 1210, when a description language of the regulation is different from the comparison language (a first language), a regulation converted into the comparison language is acquired. A conversion method may be an appropriate method, and for example, in a case where a Japanese-English bilingual translation is already present in the regulation, the English thereof may be used, or the regulation may be translated by human or translated by machine. In step 1220, similarly, when a description language of the document is different from the comparison language, a document converted into the comparison language is acquired.

In the regulation and document association process flow 1200, steps other than steps 1210 and 1220 are executed in the comparison language. The conversion source notations in the regulation-dedicated term conversion dictionary 223 and the document-dedicated term conversion dictionary 224 are also created in the comparison language.

According to the present embodiment, the following two effects are obtained. A first effect is that when a regulation and a document are described in different languages, the regulation and the document can be associated with each other through bilingual translation or translation using the comparison language. A second effect is that a result of the regulation and document association process flow 800 may vary depending on the language, such as characteristics of the language, and availability of the general textual data set 1130 described in the second embodiment, and therefore, a best comparison result can be obtained by selecting a language in which the result of the regulation and document association process flow 800 is the best as the comparison language and executing the regulation and document association process flow 1200.

Next, a fourth embodiment will be described. The fourth embodiment can be applied as means for enhancing an effect of the first embodiment, for example, in a case where the regulation has a hierarchical structure or a reference structure in the first embodiment. In descriptions of the fourth embodiment, descriptions that are the same as contents already described may be omitted.

Figure 13:
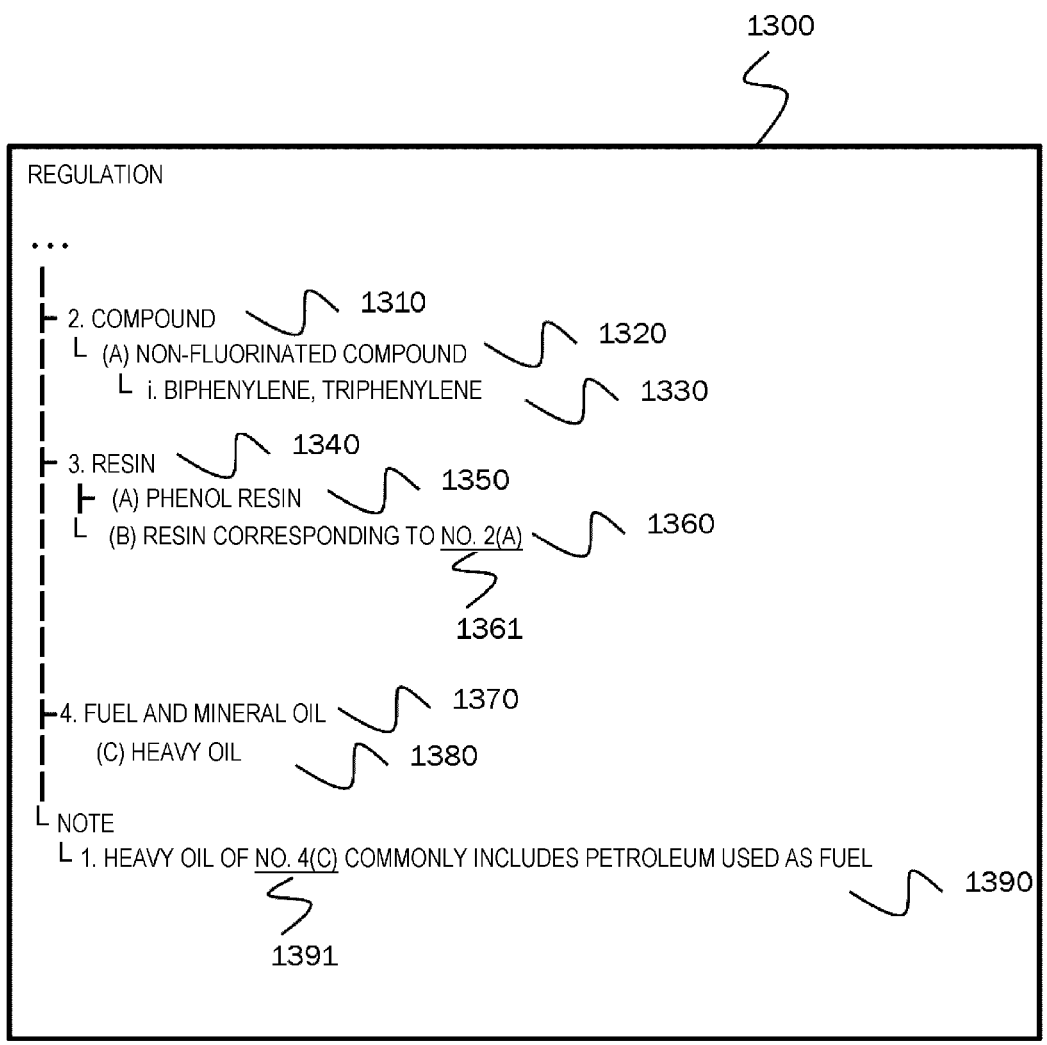
FIG. 13 illustrates an example of a regulation having a hierarchical structure and a reference relationship according to a fourth embodiment.

As represented by Customs Tariff Law or the like, in order to list various conditions and articles as targets, the regulation includes many descriptions that refer to or supplement the hierarchical structure or other provisions. FIG. 13 illustrates an example of such a regulation.

In FIG. 13, a regulation 1300 includes provisions (1310, 1320, 1330, 1340, 1350, 1360, 1370, and 1380) and a note 1390. The provision 1320 is a lower-layer item of the provision 1310, and the provision 1330 is a lower-layer item of the provision 1320. This indicates that the superior the item is, the rougher the classification is, and the lower-layer the item is, the more specific the classification is. In this example, "non-fluorinated compound" indicated by the provision 1320 is more specific than "compound" indicated by the provision 1310, and "biphenylene, triphenylene" indicated by the provision 1330 is more specific. Similarly, the provisions (1350 and 1360) are described in parallel as lower-layer items of the provision 1340. This indicates that "phenol resin" indicated by the provision 1350 and "resin corresponding to No. 2(A)" indicated by the provision 1360 are more specific than "resin" indicated by the provision 1340. Similarly, "heavy oil" indicated by the provision 1380 is more specific than "fuel and mineral oil" indicated by the provision 1370.

In general, each provision can be referred to by a number, an ID, a name, or the like. For example, the provision 1310 includes "2" at a head thereof, and the provision 1320 includes "(A)" at a head thereof. Therefore, the specific provision 1320 can be referred to by a notation "2(A)" in which these numbers, IDs, and names are listed from the higher-layer item, or a notation "No. 2(A)" including descriptions such as "No." and "item" generally indicating a provision of regulations. Reference to other provisions inside and outside a regulation including a certain provision is defined by a notation for referring to the specific provision or a notation indicating a provision in the vicinity on a hierarchy such as "any one of the following". For example, a reference 1361 "No. 2(A)" included in the provision 1360 refers to another provision 1320. This means that when comparing whether the document is associated with the provision 1360, the document is also to be compared with the provision 1320 indicated by the reference 1361. In a case where it is determined to refer to a provision of another sentence (a third sentence) other than the regulation, the provision is also a target to be compared.

In addition, there is a case where a certain description supplements another description. The note 1390 is supplemented by a reference 1391 with reference to the provision 1380. This means that the provision 1380 also includes "petroleum used as fuel" included in the note 1390.

Figure 14:
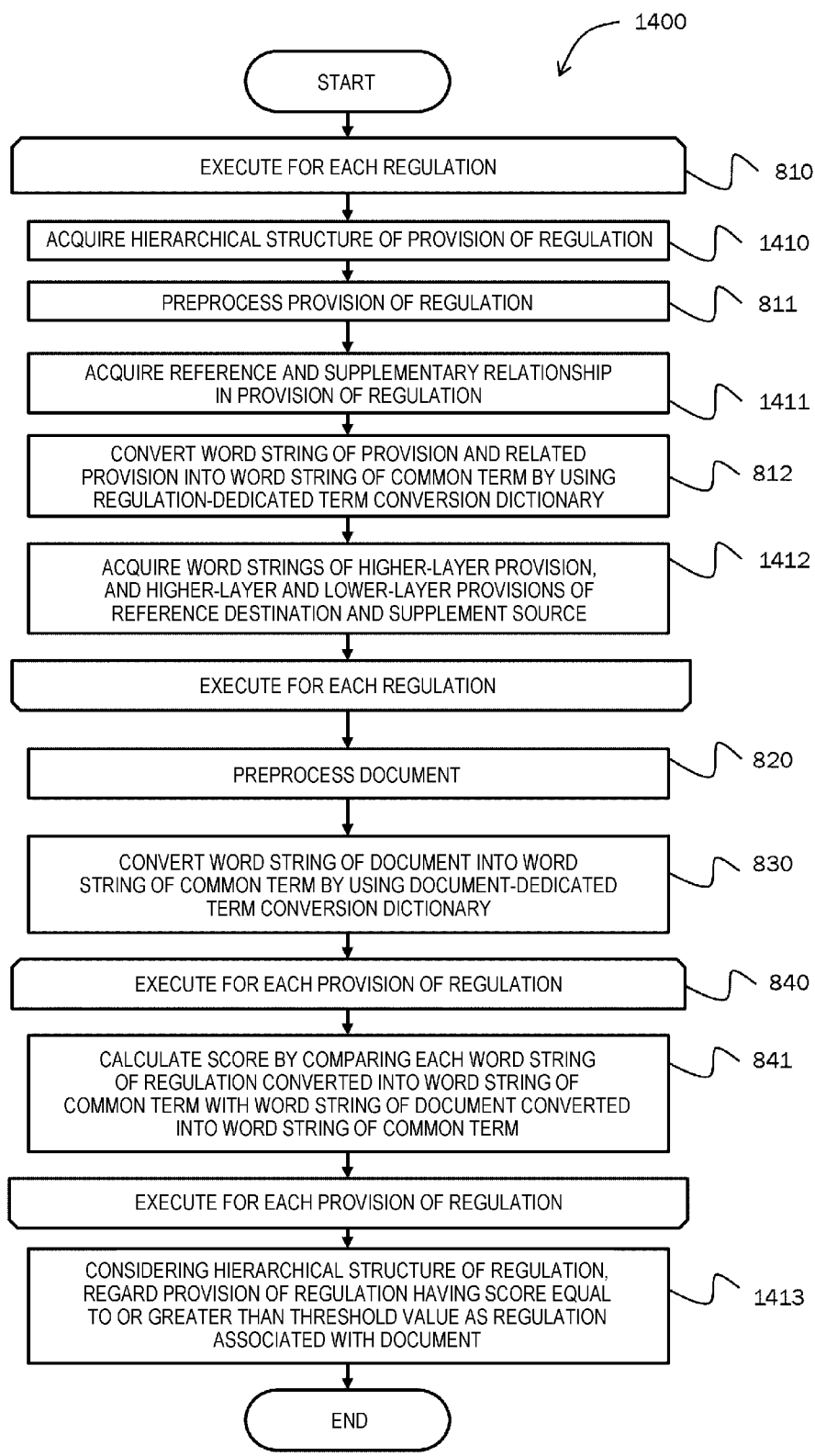
FIG. 14 illustrates a regulation and document association process flow according to the fourth embodiment.

In the present embodiment, a regulation and document association process flow 1400 is executed. FIG. 14 illustrates the regulation and document association process flow 1400. The regulation and document association process flow 1400 is a flow in which steps (1410, 1411, and 1412) are added to the regulation and document association process flow 800 in the first embodiment, and step 850 is replaced with step 1413. Hereinafter, steps (1410, 1411, 1412, and 1413) unique to the regulation and document association process flow 1400 will be described.

In step 1410, the hierarchical structure of the provision of the regulation is acquired. When a regulation is originally described in a form of a structured document by an extensible markup language (XML) or the like, a hierarchical structure thereof can be regarded as the hierarchical structure of the provision of the regulation. In addition, a method of constructing a hierarchical structure of a regulation with reference to numbers of such as an article, an item, and a section in the regulation, a method of constructing a hierarchical structure with reference to a layout or an indent in a document of the regulation, and the like can be applied to the regulation, and the hierarchical structure is acquired.

In step 1411, references and supplementary relationships to other items in the provision of the regulation are acquired. Examples of the means include means for extracting a notation indicating another item such as "No. 2(A)" or "any one of the following" in a sentence of a provision of a regulation.

In step 1412, as the word string constituting the provision of the regulation, the following word strings are added to the word string using the common term and generated based on a sentence of the provision itself in step 812.

- a word string using common terms and generated based on a provision in a higher layer
- a word string using common terms and generated based on a provision of a reference destination and provisions in higher and lower layers of the provision of the reference destination
- a word string using common terms and generated based on a provision of a supplement source and provisions in higher and lower layers of the provision of the supplement source When these word strings are added, the comparison result of step 841 may be weighted in accordance with a distance on the hierarchy from the original provision. For example, it is considered that a weight multiplied by an n-th power of 0.5 is applied to a word string of a provision in a higher layer of an n-th layer when executing the comparison in step 841. Accordingly, it is possible to control an influence of terms in the higher layer or the reference destination on the comparison result.

In step 1413, the provision of the regulation associated with the document is selected in the same manner as in step 850, but narrowing may be executed using the hierarchical structure of the regulation at that time. For example, when both provisions in a hierarchical relationship exceed a threshold value, only the lower-layer provision may be left and the higher-layer provision may be removed. As such an example, it is assumed that both the provision 1320 and the provision 1330 in the regulation 1300 obtain scores equal to or greater than the threshold value. In this case, since the provision 1330 shows a more specific content, if the provision 1330 is associated with the document, it has little significance in considering the provision 1320, which is a rougher classification, upon the administrator 190 determining whether outbound transmission is permitted. As another example, it is assumed that both the provision 1350 and the provision 1360 having a parallel positional relationship in the hierarchical structure obtain scores equal to or greater than a threshold value. In this case, it is considered that association with the provision 1340, which is a higher-layer item including the provision 1350 and the provision 1360, is executed, and individual provisions 1350 and 1360 are removed from the association.

According to the present embodiment, it is possible to associate a regulation and a document based on a hierarchical relationship, a reference relationship, or a supplementary relationship of the regulation. For example, the "biphenylene resin" can be associated with the provision 1360. The reason is that according to step 1412, the word string using the common term and generated based on the provision 1360 includes both the "resin" included in the provision 1340 which is the higher-layer item, and the "biphenylene" included in the provision 1330 which is the lower-layer item of the provision 1320, which is the reference destination of the reference 1361.

Although the embodiments have been described above, the invention is not limited to the above-mentioned embodiments, and includes various modifications. For example, a part of the configurations of the embodiments can be added, deleted, or replaced with another configuration.

As an example of the processor, a CPU may be considered, but another semiconductor device (for example, a GPU) may be used as long as being a subject that executes a predetermined process.

In the present embodiment, an example is described in which the computer system 110 converts and compares a regulation (a regulation related to laws using legal terms) and a technical document, but the invention is not limited to the example, and the computer system 110 can process a document in which two vocabularies are different. The computer system 110 may execute a process on, for example, a document that frequently uses technical terms or in-house terms. For example, the process may be executed by converting a term included in another regulation such as an in-company regulation into a general term without being limited to a regulation related to a law, or may be executed by converting a term included in another type of document into a general term without being limited to a technical document.

Although the computer system 110 is configured by a plurality of computers, the computer system 110 may be configured by a single computer that provides each function of the computer system 110.

The computer system 110 can appropriately convert a word string in a sentence. For example, a word string in a sentence to which descriptions, conditions, exceptions, and the like of a content of a preamble are added, such as a "proviso", may be converted. In addition, a word string in a sentence complementarily describing a description using parentheses, such as a "parenthesis", may be converted.

What is claimed is:

1. A method for restricting transmission of sensitive information, the method comprising:
    receiving a first document and a second document, wherein the first document has a hierarchical structure;
    applying machine learning to a regulation and a general textual data set to generate a term conversion dictionary;
    converting, using the term conversion dictionary, a word string 1 of the first document using a first term, which is used for a sentence defining a regulation, into a word string 2 corresponding to the word string 1 and described using a third term which is a term different from the first term;
    converting, using the term conversation dictionary, a word string 3 of an outbound-transmitted second document using a second term, which is used for a sentence, into a word string 4 corresponding to the word string 3 and described using the third term;
    comparing the first document and the second document to generate a comparison result, wherein the first document and the second document are compared by:
        adding, to the word string 1 obtained based on an item of the first document, a word string obtained based on a higher-layer item of the item, and
        adding, to the word string 1 obtained based on the item of the first document, a word string obtained based on an item serving as a reference destination and higher-layer and lower-layer items of the item serving as the reference destination when a particular item of the first document refers to another item of the first document or an item of a third document different from the first document and the second document; and
    selectively transmitting the second document based on the comparison result.

2. The method according to claim 1, wherein the word string 1 is converted into the word string 2 using the term conversion dictionary in which the first term is used as a conversion source term, and
    the word string 3 is converted into the word string 4 using the term conversion dictionary in which the second term is used as the conversion source term.

3. The method according to claim 2, wherein the term conversion dictionary in which the first term is used as the conversion source term is generated using a document group described using the first term and the document group described using the third term, and
    the term conversion dictionary in which the second term is used as the conversion source term is generated using the document group described using the second term and the document group described using the third term.

4. The method according to claim 1, wherein
    after the word string 1 is translated into a first language, the word string 1 is converted into the word string 2 described using the third term of the first language, and
    after the word string 3 is translated into the first language, the word string 3 is converted into the word string 4 described using the third term of the first language.

5. The method according to claim 1, wherein
    the comparison result is weighted according to a positional relationship in the hierarchical structure.

6. A non-transitory computer readable storage medium storing instructions that when executed by one or more processors cause the one or ore more processors to collectively perform the method according to claim 1.

7. A non-transitory computer readable storage medium storing instructions that when executed by one or more processors cause the one or ore more processors to collectively perform the method according to claim 4.

8. A system for restricting transmission of sensitive information, the system comprising:
    a memory;
    a communication interface; and
    one or more processors that are communicatively coupled to the memory and the communication interface, wherein the one or more processors are collectively configured to:
    receive, using the memory, a first document that a has a hierarchical structure,
    receive, using the communication interface, a second document,
    apply machine learning to a regulation and a general textual data set to generate a term conversion dictionary;
    convert, using the term conversion dictionary, a word string 1 of the first document using a first term, which is used for a sentence defining a regulation, into a word string 2 corresponding to the word string 1 and described using a third term which is a term different from the first term,
    convert, using the term conversion dictionary, a word string 3 of the second document using a second term, which is used for a sentence, into a word string 4 corresponding to the word string 3 and described using the third term,
    compare the first document and the second document to generate a comparison result, wherein the first document and the second document are compared by:
    adding, to the word string 1 obtained based on an item of the first document, a word string obtained based on a higher-layer item of the item, and
    adding, to the word string 1 obtained based on the item of the first document, a word string obtained based on an item serving as a reference destination and higher-layer and lower-layer items of the item serving as the reference destination when a particular item of the first document refers to another item of the first document or an item of a third document different from the first document and the second document, and selectively transmitting, using the communication interface, the second document based on the comparison result.

\* \* \* \* \*